United States Patent
Seo et al.

(10) Patent No.: US 10,268,242 B2
(45) Date of Patent: Apr. 23, 2019

(54) FLEXIBLE DISPLAY DEVICE

(71) Applicant: SAMSUNG DISPLAY CO., LTD., Yongin-si, Gyeonggi-do (KR)

(72) Inventors: Tae An Seo, Hwaseong-si (KR); Jin Hwan Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/011,369

(22) Filed: Jan. 29, 2016

(65) Prior Publication Data

US 2016/0338219 A1 Nov. 17, 2016

(30) Foreign Application Priority Data

May 11, 2015 (KR) .................. 10-2015-0065431

(51) Int. Cl.
| | |
|---|---|
| *F24F 11/00* | (2018.01) |
| *G01K 7/42* | (2006.01) |
| *G05D 23/32* | (2006.01) |
| *G06F 1/16* | (2006.01) |
| *G02F 1/1333* | (2006.01) |

(52) U.S. Cl.
CPC ...... *G06F 1/1652* (2013.01); *G02F 1/133308* (2013.01)

(58) Field of Classification Search
CPC .... H05K 7/16; G06F 1/1652; G02F 1/133308
See application file for complete search history.

(56) References Cited

U.S. PATENT DOCUMENTS

| | | | | |
|---|---|---|---|---|
| 6,555,235 | B1* | 4/2003 | Aufderheide | C09J 183/04 156/329 |
| 7,679,608 | B2* | 3/2010 | Murakami | G06F 3/041 345/173 |
| 8,395,319 | B2* | 3/2013 | Tchakarov | H01L 51/5203 313/504 |
| 2004/0264851 | A1* | 12/2004 | Amiri | H01H 13/702 385/31 |
| 2005/0184970 | A1* | 8/2005 | Wegert | H03K 17/96 345/173 |
| 2007/0285337 | A1* | 12/2007 | Maddock | G03B 21/58 345/1.1 |

(Continued)

FOREIGN PATENT DOCUMENTS

| | | |
|---|---|---|
| KR | 10-2007-0016772 A | 2/2007 |
| KR | 10-2011-0098349 A | 9/2011 |

(Continued)

*Primary Examiner* — David M Sinclair
*Assistant Examiner* — Theron S Milliser
(74) *Attorney, Agent, or Firm* — Lewis Roca Rothgerber Christie LLP

(57) ABSTRACT

An embodiment provides a flexible display device adhesive that is foldable with respect a folding axis, that has a folding area corresponding to the folding axis, and that has non-folding areas. The flexible display device includes a first substrate configured to be flexible, a second substrate above the first substrate and configured to be flexible, and an adhesive layer between the first substrate and the second substrate to adhere the first substrate to the second substrate. The adhesive layer includes two or more adhesive portions having different adhesive strength.

7 Claims, 3 Drawing Sheets

(56) References Cited

U.S. PATENT DOCUMENTS

| | | | | |
|---|---|---|---|---|
| 2010/0164885 A1* | 7/2010 | Hosorogi | ............... | G06F 3/0412 345/173 |
| 2014/0092330 A1* | 4/2014 | Oh | ..................... | G02F 1/133528 349/15 |
| 2014/0356615 A1* | 12/2014 | Komatsuzaki | ......... | C09J 7/0289 428/315.5 |
| 2014/0362309 A1* | 12/2014 | Tsurusaki | ................ | G06F 3/044 349/12 |
| 2015/0021157 A1* | 1/2015 | Tsurusaki | ................ | G06F 3/041 200/600 |
| 2015/0050477 A1* | 2/2015 | Komatsuzaki | ......... | C09J 7/0289 428/216 |
| 2015/0070601 A1* | 3/2015 | Lin | ..................... | G02F 1/13338 349/12 |
| 2015/0103474 A1* | 4/2015 | Cho | ........................ | B29C 39/12 361/679.01 |

FOREIGN PATENT DOCUMENTS

| | | |
|---|---|---|
| KR | 10-2014-0033546 A | 3/2014 |
| KR | 10-2014-0141707 A | 12/2014 |

\* cited by examiner

FLEXIBLE DISPLAY DEVICE

CROSS-REFERENCE TO RELATED APPLICATION

This application claims priority to and the benefit of Korean Patent Application No. 10-2015-0065431 filed in the Korean Intellectual Property Office on May 11, 2015, the entire contents of which are incorporated herein by reference.

BACKGROUND

1. Field

The described technology relates generally to a flexible display device, and to a flexible display device that can reduce durability deterioration even in the case of continuous or repeated folding.

2. Description of the Related Art

Various display devices that include a flat panel display, such as a liquid crystal display, an electric field emission display, a plasma display panel, an organic light emitting display, and the like, have been developed.

With the recent development of display-related techniques, deformable display devices, which are, for example, foldable, rollable, or stretchable like a rubber band, have been researched and developed. The display devices may display various user interfaces and images depending on a deformation form, and thus utilization thereof is high.

Among them, in a foldable display device, which is folded based on one axis, to satisfy foldable flexibility, respective layers, such as a cover window, a touch substrate, and a display substrate, are formed as thin as possible, and adhesive layers are formed using a high elastic material, such as an optical clear resin (OCR) or a pressure sensitive adhesive (PSA) to adhere the respective layers.

However, when the foldable display device is continuously or repeatedly folded, the adhesive layer positioned in the folding axis exhibits elastic deformation as compared to the peripheral areas, and non-uniform stress distribution is repeated at the same adhesive layer, thereby generating plastic deformation of the adhesive layer. This causes delamination between the adhesive layer and other layers. Thus, the overall durability of the flexible display device is deteriorated.

The above information disclosed in this Background section is only to enhance the understanding of the background of the invention, and therefore it may contain information that does not form the prior art that is already known in this country to a person of ordinary skill in the art.

SUMMARY

The described embodiments provide a flexible display device that may reduce durability deterioration by configuring an adhesive layer having two or more adhesive portions with different adhesive forces even when the foldable display device is continuously or repeatedly folded.

An embodiment provides a flexible display device that may be foldable with respect to a folding axis, that has a folding area corresponding to the folding axis, and that has non-folding areas, the flexible display device includes a first substrate configured to be flexible, a second substrate above the first substrate and configured to be flexible, and an adhesive layer between the first substrate and the second substrate to adhere the first substrate to the second substrate, wherein the adhesive layer includes two or more adhesive portions having different adhesive strength.

The adhesive portions may include a first adhesive portion in the folding area, and a second adhesive portion in the non-folding area.

An adhesive strength of the second adhesive portion may be greater than that of the first adhesive portion.

The first adhesive portion may have viscoelasticity, and a portion of the first adhesive portion at which the folding axis is positioned is thicker than the second adhesive portion.

A portion of the second substrate adhesive may be raised at the folding axis position, and the first adhesive portion may be between the second substrate and the first substrate.

The adhesive force of the first adhesive portion may be in a range of about 500 gf/mm to about 1000 gf/mm.

The adhesive force of the second adhesive portion may be in a range of about 1000 gf/mm to about 5000 gf/mm.

The adhesive portions may include a third adhesive portion that is between the first adhesive portion and the second adhesive portion to adhere the first adhesive portion to the second adhesive portion.

The third adhesive portion may include a mixture of materials of which the first adhesive portion and the second adhesive portion.

The first substrate may be a display substrate configured to display an image, and the second substrate may include a touch substrate.

In the flexible display device according to the above embodiment, it is possible to prevent or reduce plastic deformation of an adhesive layer, and to prevent or reduce delamination between the adhesive layer and substrates, by absorbing stresses that are non-uniformly generated for areas in the flexible display device by folding through the first adhesive portion, the second adhesive portion, and the third adhesive portion, which have different adhesive forces. In brief, it is possible to provide a flexible display device that can reduce durability deterioration when it is continuously or repeatedly folded.

DETAILED DESCRIPTION

Figure 1:
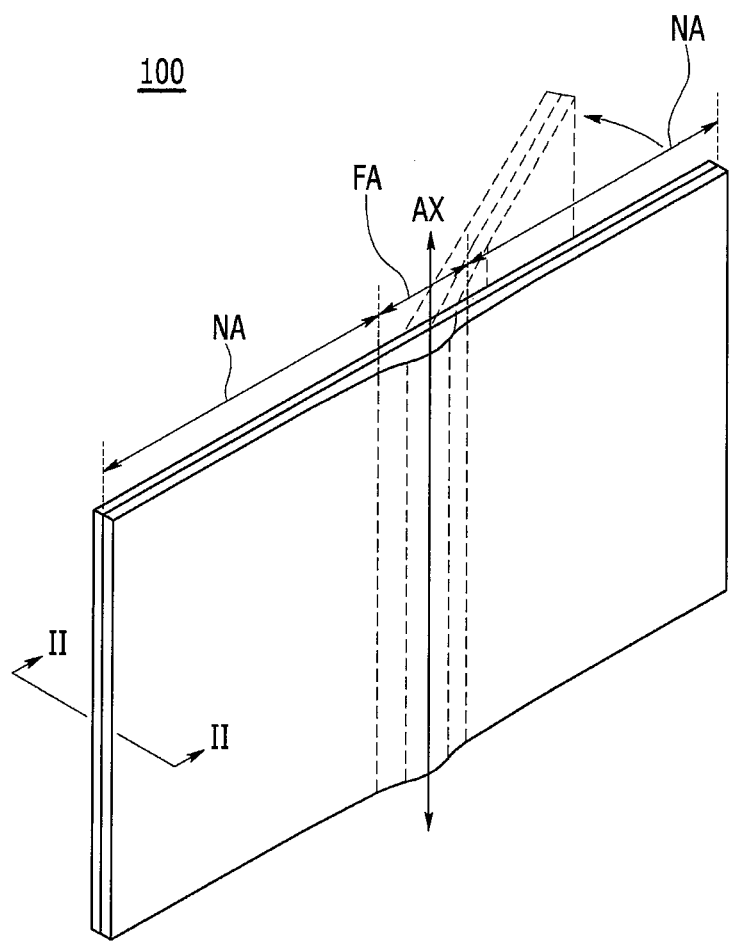
FIG. 1 is a perspective view illustrating a flexible display device according to an exemplary embodiment.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, a flexible display device according to an exemplary embodiment will be described with reference to FIG. 1 to FIG. 3.

Figure 2:
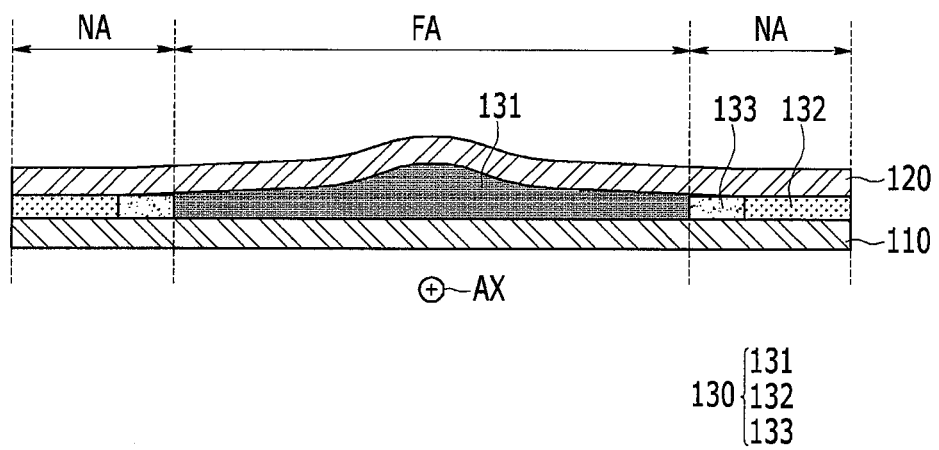
FIG. 2 is a cross-sectional view taken along the line II-II of FIG. 1.
Figure 3:
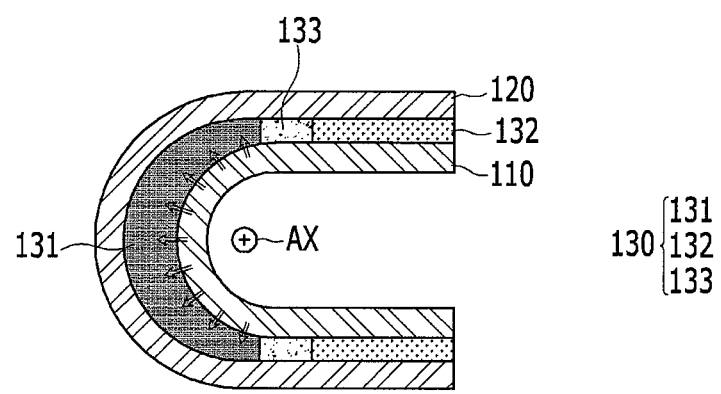
FIG. 3 is a cross-sectional view of the flexible display device illustrated FIG. 2 with respect to a folding axis.

FIG. 1 is a perspective view illustrating a flexible display device according to an embodiment, FIG. 2 is a cross-sectional view taken along the line II-II of FIG. 1, and FIG. 3 is a cross-sectional view of the flexible display device illustrated FIG. 2 with respect to a folding axis.

The flexible display device 100 according to an embodiment may be a foldable display device that is flexible, and that can be folded with respect to one axis serving as a folding axis AX.

In the flexible display device 100, a folding axis AX, and a region that is adjacent the folding axis AX, which is directly deformed by a folding stress, are defined as a folding area FA, and regions other than the folding area FA are defined as non-folding areas NA. In the present embodiment, as shown in FIG. 1, and depending on a radius of curvature of the folding area FA, the folding axis AX is located to vertically extend through, or in parallel to, a central portion of the flexible display device 100 in FIG. 1. Accordingly, the central portion and the folding area AX extending through, or parallel to, the central portion are defined as a folding area FA, and the regions that are adjacent the folding area FA are defined as non-folding areas NA. In the present embodiment, the folding area FA is between two non-folding areas NA.

However, the scope of the present embodiment is not necessarily limited to the above, and the position of the folding central axis AX, the number of folding axes, the position and disposition of the folding area FA, and the position(s) of the non-folding area NA may be varied according to a particular display device. As a non-limiting example, the folding axis may be positioned at a left or right side, as seen in FIG. 1, it may extend in a horizontal direction or in a vertical direction, and two folding axes crossing each other may be set.

The flexible display device 100 of the present embodiment may be a display device for displaying an image regardless of the operating principle of the display device (e.g., a driving a liquid crystal display configured to include a backlight unit, a thin film transistor array substrate, a liquid crystal layer, and an alignment layer, or an organic light emitting device configured to include a thin film transistor array substrate, an organic light emitting element, and an encapsulation layer).

The flexible display device 100 according to an embodiment 100 may include a first substrate 110, a second substrate 120, and an adhesive layer 130.

As seen in FIG. 2, the first substrate 110 is located at the lower end of the flexible display device 100, the second substrate 120 is located above the first substrate 110, and the adhesive layer 130 is between the first substrate 110 and the second substrate 120 to adhere the first substrate 110 and the second substrate 120 together.

As further shown in FIG. 2, the first substrate 110, the second substrate 120, and the adhesive layer 130 include regions that are defined as the folding area FA and the adjacent non-folding area NA, and that are defined with respect to the folding axis AX.

The first substrate 110 may include a thin film transistor, an organic emission layer, an electrode layer, and an encapsulation layer sequentially stacked thereon, or may include a thin film transistor, a liquid crystal layer, an alignment layer, and color filter layer sequentially stacked thereon, to constitute a display panel for displaying an image, and the second substrate 120 may include a touch sensor electrode and a polarizer to constitute a touch panel.

However, the scope of the present embodiment is not necessarily limited thereto, and the second substrate 120 may be a constituent element of a cover window for protecting a physical and chemical impact of the first substrate 110 from the outside, may be a printed circuit board in which a circuit pattern is printed and that is electrically connected to the first substrate 110, or may be an encapsulation substrate for encapsulating the first substrate 110. Alternatively, depending on the disposition of the substrates, the second substrate 120 may be a display substrate, or may be a touch substrate, a cover window, a printed circuit board (PCB), or an encapsulation substrate, which are described above.

The first substrate 110 and the second substrate 120 may be made of a glass, a quartz, a ceramic, a metal, or a plastic. Particularly, when made of a flexible plastic such as polyimide (PI), the first substrate 110 and the second substrate 120 may have flexibility so as to perform a foldable operation, a stretchable operation, or a rollable operation.

The adhesive layer 130 serves to adhere the first substrate 110 with the second substrate 120, and is made of an elastic material such that it is elastically deformed to be folded when the flexible display device 100 is continuously or repeatedly folded.

When the flexible display device 100 is folded, stress is applied to the folding area FA with respect to the folding axis AX, and the applied stress is gradually reduced when moving from an area closet to the folding axis AX toward the non-folding area NA. Accordingly, stress distribution in the adhesive layer may become non-uniform, thereby causing delamination between the adhesive layer and the substrates.

Accordingly, in the present embodiment, to prevent the delamination, the adhesive layer 130 is configured to include two or more adhesive portions having different adhesive forces, such that adhesiveness, or adhesive strength, increases from the folding axis AX toward the non-folding area NA.

As shown in FIG. 2, the two or more adhesive portions may be integrally formed to have a structure constituting one layer. Accordingly, it is possible to reduce an effect of non-uniform stress distribution, which may be caused by such folding, between the adhesive layer and the substrates.

Specifically, the adhesive layer 130 includes adhesive portions having different adhesive forces, for example, a first adhesive portion 131, a second adhesive portion 132, and a third adhesive portion 133.

The first adhesive portion 131 is at a region positioned in the folding area FA of the adhesive layer 130. When the flexible display device 100 is folded with respect to the folding axis AX, as shown in FIG. 3, a stress generated by contraction of the first substrate 110 and release, or stretching, of the second substrate 120 is applied to the first adhesive portion 131 in a direction indicated by the arrows in FIG. 3, thereby facilitating elastic deformation.

In the case of the first adhesive portion 131, if a simple elastic adhesive is used, a stress may be transferred from the folding area FA toward the non-folding area NA particularly due to repeated folding, thereby potentially causing delamination between the adhesive layer 130 and the substrates. Thus, in the present embodiment, the first adhesive portion 131 may be formed as a structure having viscoelasticity. As a result, it is possible to reduce a possibility that the stresses generated in the folding area FA are transferred to the second adhesive portions 132 pertaining to the non-folding area NA.

The adhesive force of the first adhesive portion 131 may be about 500 gf/mm or more to maintain adhesion with adjacent substrates, and may be about 1000 gf/mm or less, such that the first adhesive portion 131 exhibits a viscoelastic behavior. The first adhesive portion 131 may be made of silicone rubber as a main component, and may be made of a silicone-based adhesive material in which an adhesive resin and catalyst are mixed.

When the first adhesive portion 131 is folded, the greatest stress is applied to a portion of the first adhesive portion 131 adjacent the folding axis AX, and the applied stress is gradually reduced toward the second adhesive portion 132.

More specifically, the part to which the greatest stress is applied by the viscoelastic behavior is also the most deformed, and if the thickness of the first adhesive portion 131 is uniform, then the first adhesive portion 131 positioned adjacent the folding axis AX is deformed to a greatest extent when folded. Accordingly, there is a possibility that friction will be directly generated between the first substrate 110 and the second substrate 120.

Therefore, in the present embodiment, a portion of the first adhesive portion 131 adjacent the folding axis AX is thicker than that of the second adhesive portion 132. As shown in FIG. 2, the portion of the first adhesive portion 131 at which the folding axis AX is positioned may be formed to have a hill shape. Further, a portion of the second substrate 120 may be raised above the position of the folding axis, and the first adhesive portion 131 may be between the second substrate 120 and the first substrate 110. That is, to cover an upper portion of the first adhesive portion 131 that is thicker above the folding axis AX, the second substrate 120 may be further from the first substrate 110 above the folding axis AX when compared to the non-folding areas NA. The raised structure of the second substrate 120 may longitudinally extend along the folding axis AX as shown in FIG. 1.

As such, by forming the raised structure in the second substrate 120, the flexible display device 100 can be continuously or repeatedly folded without generating direct friction between the first substrate 110 and the second substrate 120, as shown in FIG. 3. Whenever the flexible display device 100 is folded, the first adhesive portion 131 may be deformed such that the thickness thereof is reduced by the stress generated by the viscoelastic behavior, as shown in FIG. 3, and the first adhesive portion 131 is longitudinally extended toward the second adhesive portion 132 by the reduced volume.

In other words, in the present embodiment, although the stress caused by the folding is applied to the first adhesive portion 131, it is possible to control the first substrate 110 and the second substrate 120 to be separated from each other while more uniformly maintaining the distance therebetween during the folding by adjusting the shape of the second substrate 120 such that a portion of the first adhesive portion 131, to which the stress is largely applied, is formed to be thicker than a portion of the first adhesive portion 131 to which the stress is not largely applied to compensate for the magnitude of the stress.

However, the scope of the present embodiment is not necessarily limited thereto, and each of the first substrate 110 and the second substrate 120 may have various structures in which a region of the first adhesive portion 131 adjacent the folding axis AX is formed to be thicker than the other regions. As a non-limiting example, the first substrate 110 may have a shape that is recessed with respect to the first adhesive portion 131.

The second adhesive portion 132 may be formed at the non-folding area NA of the adhesive layer 130. In the present embodiment, the non-folding area NA is positioned at opposite sides of the folding area FA, and thus the second adhesive portion 132 is also positioned at opposite sides of the first adhesive portion 131.

In the present embodiment, the adhesive strength of the second adhesive portion 132 is greater than that of the first adhesive portion 131. The adhesive force of the second adhesive portion 132 may be about 1000 gf/mm or more to prevent delamination from the substrates by the stress transferred from the first adhesive portion 131, which is folded, and may be about 5000 gf/mm to maintain the adhesiveness without permanent adhesion of the substrates. The second adhesive portion 132 may be formed by using an acryl-based adhesive material obtained by copolymerizing an acryl monomer.

As such, it is possible to have strong adhesion between the substrates 110 and 120 and the adhesive layer 130 in the non-folding area NA when it is folded by adjusting the adhesive force of the second adhesive portion 132 to be greater than that of the first adhesive portion 131.

The third adhesive portion 133 is between the first adhesive portion 131 and the second adhesive portion 132 to fix the first adhesive portion 131 and the second adhesive portion 132 to each other. In the present embodiment, the third adhesive portion 133 may be positioned in the non-folding area NA as shown in FIG. 2 and FIG. 3, but the present exemplary embodiment is not limited thereto. The third adhesive portion 133 may be positioned at an outer circumference, or at an outer edge, of the folding area FA, and may be at an area that is adjacent the non-folding area NA.

The third adhesive portion 133 may have an adhesive force that ranges between the adhesive forces of the first adhesive portion 131 and the second adhesive portion 132. The third adhesive portion 133 may be made of synthetic rubber as a main component, and may be made of an adhesive material in which an adhesive resin, an anti-curing agent, and the like are mixed, or may be formed by using an adhesive material in which the silicone-based adhesive material of the first adhesive portion 131 and the acryl-based adhesive material of the second adhesive portion 132 are mixed.

Meanwhile, in the case where the third adhesive portion 133 is made of a mixture of the silicon-based adhesive material of the first adhesive portion 131 and the acryl-based adhesive material of the second adhesive portion 132, the first adhesive portion 131 and the second adhesive portion 132 are first located, are diffused at end portions thereof, and are mixed with each other to form the third adhesive portion 133. As a result, the adhesiveness thereof may gradually increase from the first adhesive portion 131 toward the second adhesive portion 132.

The flexible display device 100 in the present embodiment, it is possible to reduce or prevent plastic deformation of the adhesive layer 130, and to reduce or prevent delamination between the adhesive layer 130 and the substrates by absorbing stresses that are non-uniformly generated in areas of the flexible display device 100 by folding through the first adhesive portion 131, the second adhesive portion 132, and the third adhesive portion 133, which have different adhesive forces. In brief, the flexible display device 100 can reduce durability deterioration when continuously or repeatedly folded.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

What is claimed is:

1. A flexible display device that is foldable with respect to a folding axis, that has a folding area corresponding to the folding axis, and that has non-folding areas, the flexible display device comprising:
   a first substrate configured to be flexible;
   a second substrate above the first substrate, comprising a uniform material, and configured to be flexible; and
   an adhesive layer between the first substrate and the second substrate to adhere the first substrate to the second substrate,
   wherein the adhesive layer comprises a first adhesive portion in the folding area and a second adhesive portion in the non-folding area and a third adhesive portion,
   wherein the third adhesive portion is different from, and is between, the first adhesive portion and the second adhesive portion to adhere the first adhesive portion to the second adhesive portion, wherein an adhesive strength of the first adhesive portion is different from that of the second adhesive portion, wherein the adhesive strength of the second adhesive portion in the non-folding area is greater than that of the first adhesive portion in the folding area, wherein the first adhesive portion, the second adhesive portion and the third adhesive portion are integrally formed to form the adhesive layer, and wherein a portion of the second substrate comprises a raised structure having a continuous radius of curvature corresponding to the folding axis due to an increased thickness of the first adhesive portion in a direction that is normal to the first and second substrates adjacent the folding axis.

2. The flexible display device of claim 1, wherein the first adhesive portion has viscoelasticity, and wherein a portion of the first adhesive portion at which the folding axis is positioned is thicker than the second adhesive portion in the direction that is normal to the first and second substrates, and that is perpendicular to the folding axis.

3. The flexible display device of claim 1, wherein the raised structure extends along the folding axis.

4. The flexible display device of claim 1, wherein the adhesive strength of the first adhesive portion is in a range of about 500 gf/mm to about 1000 gf/mm.

5. The flexible display device of claim 1, wherein the adhesive strength of the second adhesive portion is in a range of about 1000 gf/mm to about 5000 gf/mm.

6. The flexible display device of claim 1, wherein the third adhesive portion comprises a mixture of materials of which the first adhesive portion and the second adhesive portion comprise.

7. The flexible display device of claim 1, wherein the first substrate is a display substrate configured to display an image, and the second substrate comprises a touch substrate.

* * * * *